United States Patent
Leung et al.

(10) Patent No.: US 12,415,633 B2
(45) Date of Patent: Sep. 16, 2025

(54) MULTISTAGE SUSPENSION FOR UAV LANDING GEAR

(71) Applicant: WING Aviation LLC, Mountain View, CA (US)

(72) Inventors: Ray Leung, Fremont, CA (US); Elizabeth Marshman, San Francisco, CA (US); Adem Rudin, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 358 days.

(21) Appl. No.: 18/086,259

(22) Filed: Dec. 21, 2022

(65) Prior Publication Data

US 2024/0208678 A1    Jun. 27, 2024

(51) Int. Cl.
| | |
|---|---|
| *B64U 60/50* | (2023.01) |
| *B64C 25/34* | (2006.01) |
| *B64C 25/62* | (2006.01) |
| *B64U 10/25* | (2023.01) |

(52) U.S. Cl.
CPC .............. *B64U 60/50* (2023.01); *B64C 25/34* (2013.01); *B64C 25/62* (2013.01); *B64U 10/25* (2023.01)

(58) Field of Classification Search
CPC ........ B64U 60/50; B64U 10/25; B64C 25/34; B64C 25/62; B64C 25/64; B64C 25/58
See application file for complete search history.

(56) References Cited

U.S. PATENT DOCUMENTS

| | | | | |
|---|---|---|---|---|
| 1,668,887 | A * | 5/1928 | Blair ....................... | B64C 25/62 244/100 R |
| 2,326,210 | A * | 8/1943 | Falk ........................ | B64C 25/02 244/104 R |
| 3,042,345 | A * | 7/1962 | Holland, Jr. ............ | B64C 25/60 244/100 R |
| 3,053,480 | A * | 9/1962 | Vanderlip ............... | B64C 27/54 244/17.13 |

(Continued)

OTHER PUBLICATIONS

Cutler, How the 4 Types of Landing Gear Struts Work, Bold Method, https://www.boldmethod.com/learn-to-fly/systems/how-the-4-types-of-landing-gear-struts-work, May 26, 2016, 9 pages.

(Continued)

Primary Examiner — Kimberly S Berona
Assistant Examiner — Steven J Shur
(74) Attorney, Agent, or Firm — Christensen O'Conoor Johnson Kindness PLLC (57) ABSTRACT

A landing gear assembly for an unmanned aerial vehicle (UAV) includes a shock tower, a pair of leg members, and suspension assemblies. The shock tower is adapted to mount to a frame of a fuselage of the UAV and includes upper and lower end mounts. The leg members are adapted to extend out from opposing sides of the lower end mounts. The leg members are flexible and each include an upper leg section pivotally mounted to the lower end mount and a lower leg section adapted to connect to a ground gear. The suspension assemblies are each mounted to and extend between the upper end mount and a corresponding one of the leg members. The suspension assemblies each include a damper and a spring.

16 Claims, 9 Drawing Sheets

(56) References Cited

U.S. PATENT DOCUMENTS

| | | | | |
|---|---|---|---|---|
| 4,142,698 | A | * | 3/1979 | Niebanck .............. B64C 25/00 |
| | | | | 244/104 R |
| 4,645,143 | A | * | 2/1987 | Coffy ................... B64C 25/52 |
| | | | | 244/108 |
| 5,224,669 | A | * | 7/1993 | Guimbal ............... B64C 25/52 |
| | | | | 244/108 |
| 8,967,346 | B2 | | 3/2015 | Polakowski et al. |
| 10,899,436 | B2 | | 1/2021 | Gentry |

OTHER PUBLICATIONS

Traxxas RC Suspension Tuning Guide: Part 3 Shock Position and Roll Center, https://traxxas.com/news/suspension-tuning-guide-part 3, downloaded from internet Nov. 9, 2022, 5 pages.

Bingelis, Spring Steel Landing Gears, EAA Sport Aviation, May 1979, 5 pages.

* cited by examiner

MULTISTAGE SUSPENSION FOR UAV LANDING GEAR

TECHNICAL FIELD

This disclosure relates generally to landing gear suspensions for unmanned aerial vehicles (UAVs), and in particular but not exclusively, relates to landing gear suspensions for short takeoff and landing (STOL) UAVs.

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions. One type of unmanned aerial vehicle (UAV) is a vertical takeoff and landing (VTOL) UAV. VTOL UAVs are currently deployed in limited use for package delivery missions. The VTOL capability enables a UAV to pick up packages from almost anywhere and deliver them to almost anywhere. Additionally, VTOL enables a low-touch, scalable delivery operation because the aircrafts are able to perform pre-flight functional checks, takeoff and land within a small footprint, and charge their batteries without human intervention or expensive, bulky ground support equipment that requires significant operator training and real estate.

Unfortunately, VTOL capability significantly limits the range of electric aircraft (compared to a similarly sized fixed wing aircraft) due to the amount of power required to hover and the significant fraction of aircraft mass dedicated to the hover propulsion system. For example, twelve seconds of hover time may be worth one kilometer of cruise range. This is because the aircraft must produce enough thrust to support its entire weight while hovering, whereas in cruising flight only enough thrust to balance the force of aerodynamic drag—typically 5-10 times less than the vehicle's weight—is needed.

When considering UAV configurations suitable for aerial delivery of heavier payloads over longer distances, it may be beneficial to relax—or even eliminate—the VTOL requirement to minimize energy consumption in takeoff, landing, and delivery and to reduce propulsion system weight. That said, it is still desirable to minimize the real estate and ground support infrastructure required to operate non-VTOL UAVs. Accordingly, a fixed-wing UAV designed for longer distance flight carrying heavier payloads while having a short take-off and landing (STOL) capability may be desirable. The STOL capability typically means these UAVs will have a steeper approach angle than normal. The steeper approach angle can result in hard landings. As such, it may be desirable to tailor the landing gear of STOL UAVs to accommodate the greater impact forces that can accompany steeper landing approaches while maintaining a low drag and low weight form factor.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation of a landing gear assembly for an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Landing gear is the undercarriage of an aircraft that supports the aircraft when it is on the ground enabling it to land, takeoff, and taxi without damage. The landing gear should be designed to accommodate the weight of the aircraft and bear the loads/shocks that occur during landings. For vertical takeoff and landing (VTOL) aircraft, the take-offs and landings are generally vertical while conventional aircraft employ gradual, low angle ascents and descents. A short takeoff and landing (STOL) aircraft employs ascent and descent angles that fall between VTOL aircraft and conventional aircraft. The steeper angles often can result in higher impact energies than conventional low angle approaches. The impact energies may also be greater than VTOL aircraft, which are typically lighter and have the ability to hover and carefully manage their descent speed right to the ground. The landing gear described herein is a multistage suspension capable of carrying the loads associated with STOL aircraft without bottoming out and hitting hard stops that may damage, not only the landing gear assembly, but also the aircraft frame and fuselage. Additionally, embodiments of the landing gear are capable of dissipating the energy absorbed at impact in a controlled manner, thereby avoiding an uncontrolled flight mode due to rebound that lifts the aircraft off the ground. Embodiments of the landing gear assembly include flexible leg members and suspension assemblies with distinct spring constants that can be independently designed/tuned to bear the necessary loads. In some embodiments, preload bumpers are also included and their preload compression independently adjusted as well. These three distinct spring components together provide an adjustable, multistage, damped suspension. While the landing gear assembly is adaptable for use with a variety of aircraft types, it is generally suitable for UAVs, and in particular, for STOL UAVs adapted to provide a package delivery service.

Figure 1A:
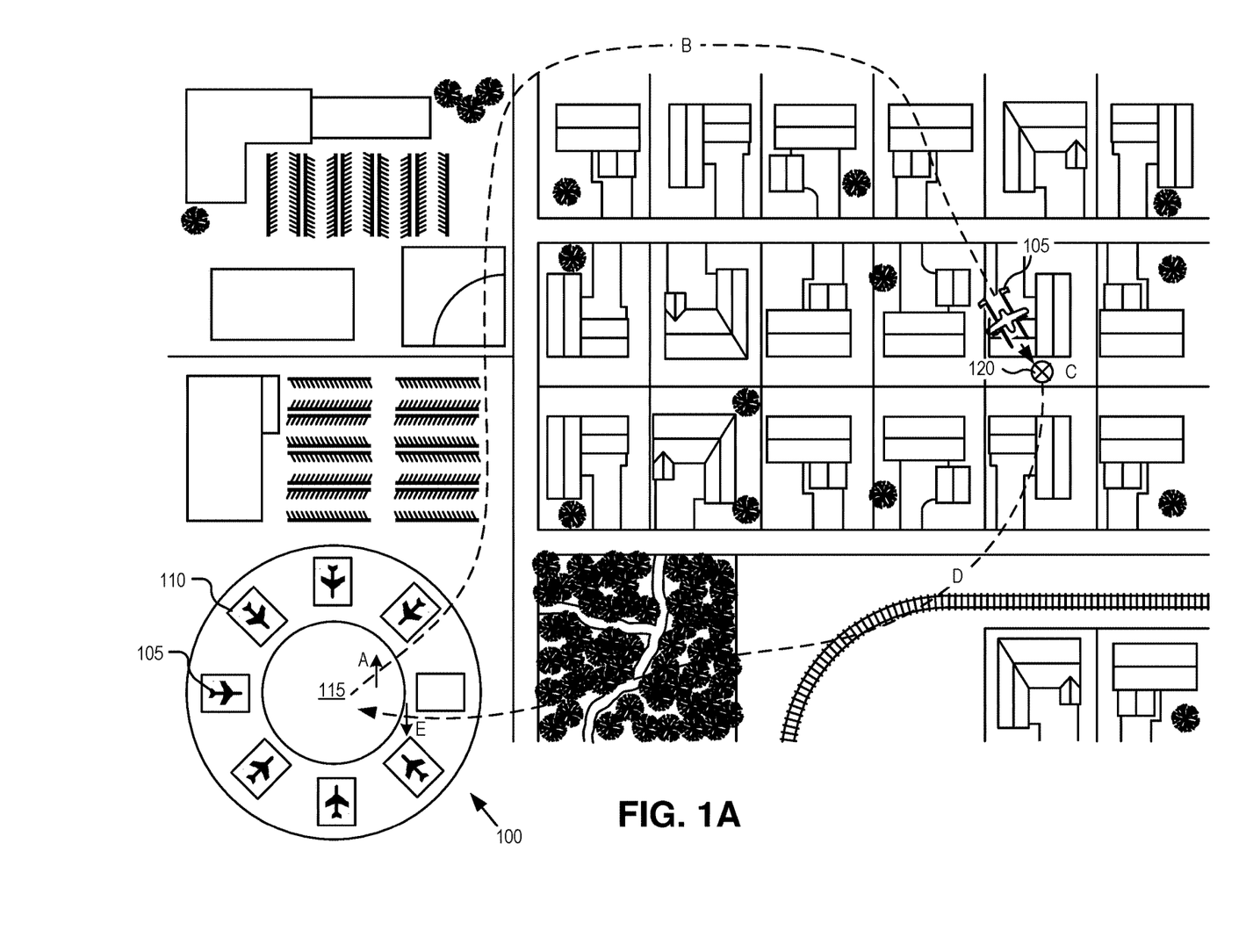
FIG. 1A illustrates a package delivery mission staged from a terminal area and executed by short takeoff and landing (STOL) unmanned aerial vehicles (UAVs), in accordance with an embodiment of the disclosure.

UAVs may be provisioned to perform a variety of different mission types, including package delivery, aerial photography, public safety, etc. These UAVs may stage from an operations facility close to the neighborhood being served by a fleet of UAVs. As such, it is desirable to minimize the real estate and ground support infrastructure required to operate non-VTOL UAVs. Specifically, it is desirable to reduce the surface area dedicated to takeoff and landing, so that operations can fit into a public space, like mall parking lots, commercial rooftops, etc. FIG. 1A illustrates an example terminal area 100 staging a plurality of STOL UAVs, such as UAVs 105, that provide a package delivery service to a nearby neighborhood. In the illustrated embodiment, UAVs 105 are staged on charging pads 110 that ring a circular runway area 115.

Each package delivery mission includes a number of segments include a takeoff segment A, a cruise segment B, a package drop-off segment C, a return cruise segment D, and a landing segment E. Take-off segment A includes taxiing along the runway area 115 under high thrust and the initial stages of flight until clearing the perimeter fence of the terminal area 100 while carrying the payload and climbing to cruise altitude. Cruise segment B includes the cruise time to the destination 120 while carrying the package payload. Drop-off segment C includes the flight time surrounding the package drop-off. Cruise segment D includes the cruise time from the destination 120 after dropping off the package and resuming the higher airspeed associated with regular forward cruise until reaching the vicinity of terminal area 100. Landing segment E includes the slower airspeed associated with an approach into runway area 115, touchdown, and the subsequent deceleration and ground roll after touchdown.

Figures 1B, 1C:
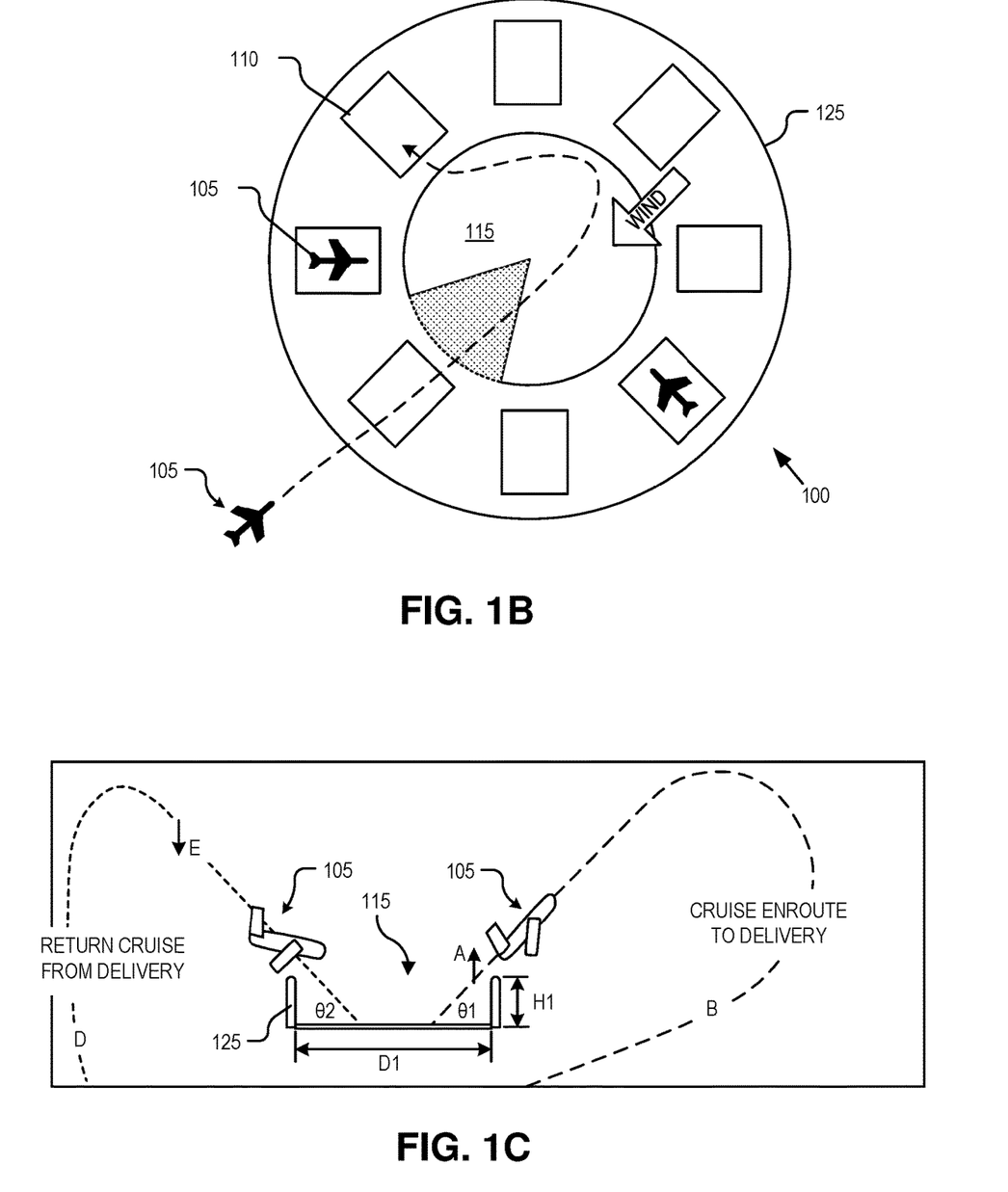
FIG. 1B illustrates a terminal area having a circular runway area for use with STOL UAVs, in accordance with an embodiment of the disclosure.
FIG. 1C illustrates landing and takeoff segments of a package delivery mission executed by a STOL UAV, in accordance with an embodiment of the disclosure.

FIG. 1B illustrates greater detail of terminal area 100 having a circular runway area 115 for use with UAVs 105, in accordance with an embodiment of the disclosure. As illustrated, terminal area 100 includes charging pads 110 arrayed around the perimeter of circular runway area 115 for charging UAVs 105 while the outer perimeter 125 may be lined with a security fence or wall. In one embodiment, circular runway area 115 has a diameter of approximately 90 ft while outer perimeter 125 has a diameter D1 of 100 ft and the perimeter fence/wall has a height H1 of 8 ft (see FIG. 1C). Of course, other dimensions may be implemented.

The STOL characteristics of UAVs 105 facilitate the circular shape of runway area 125 within a reasonable sized footprint. In turn, the circular shape of runway area 125 enables UAVs 105 to approach and depart from any direction. This flexibility permits UAVs 105 to approach and depart into the wind (within a feasible approach/departure wedge) thereby reducing issues associated with crosswinds and maintaining short takeoff and landing distances. FIG. 1C illustrates how UAV 105 executes slow and steep landings (arrivals) and takeoffs (departures). In some embodiments, departure paths having a climb angle θ1 of 50 degrees and arrival paths having an approach angle θ2 of 18 degrees may be implemented. These steep arrivals and departures may be accomplished with distributed propulsion providing blown control and lift surfaces along with a robust landing gear assembly to bear the initial impact forces and control the rebound response.

Figure 2A:
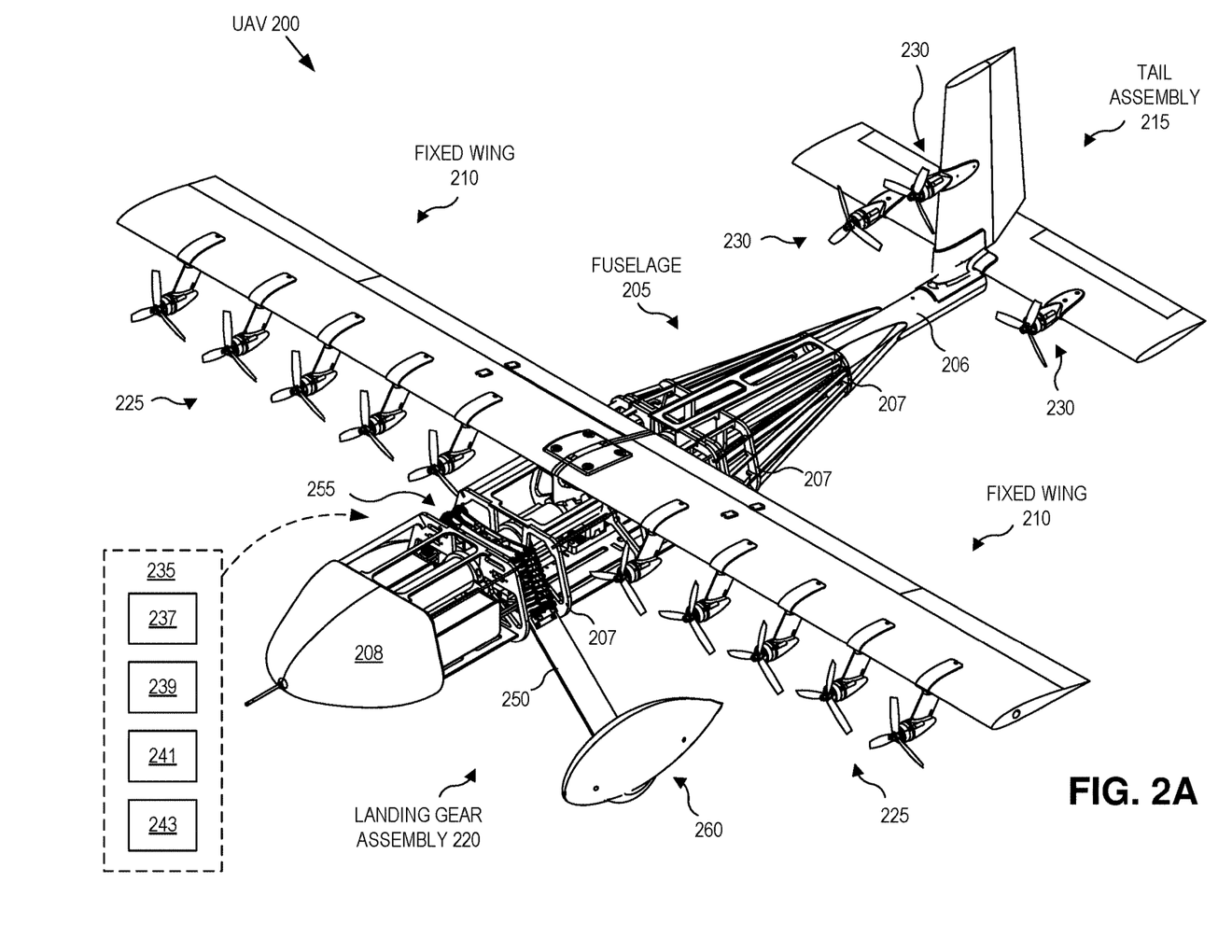
FIG. 2A is a perspective view illustration of a STOL UAV with multistage suspension to accommodate high impact landings, in accordance with an embodiment of the disclosure.
Figure 2B:
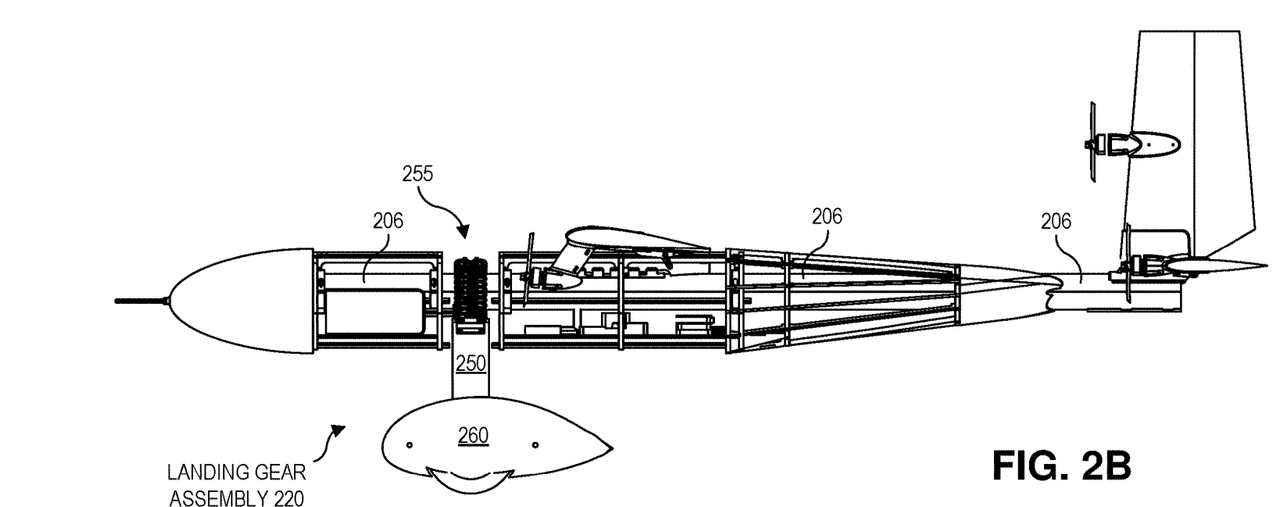
FIG. 2B is a side view illustration of the STOL UAV, in accordance with an embodiment of the disclosure.
Figure 2C:
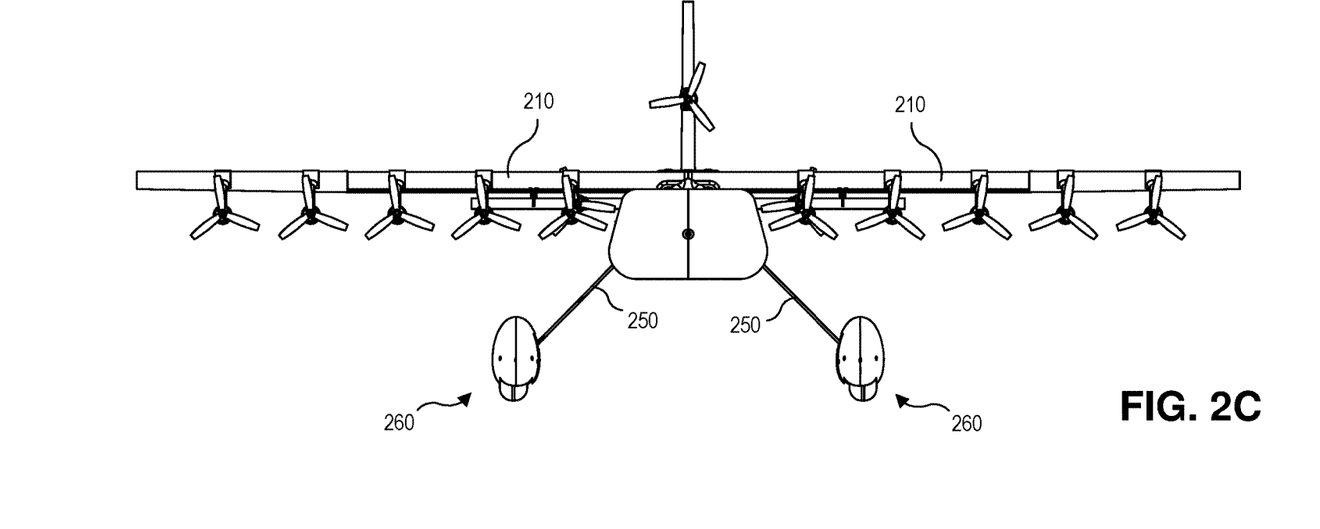
FIG. 2C is a front view illustration of the STOL UAV, in accordance with an embodiment of the disclosure.
Figure 2D:
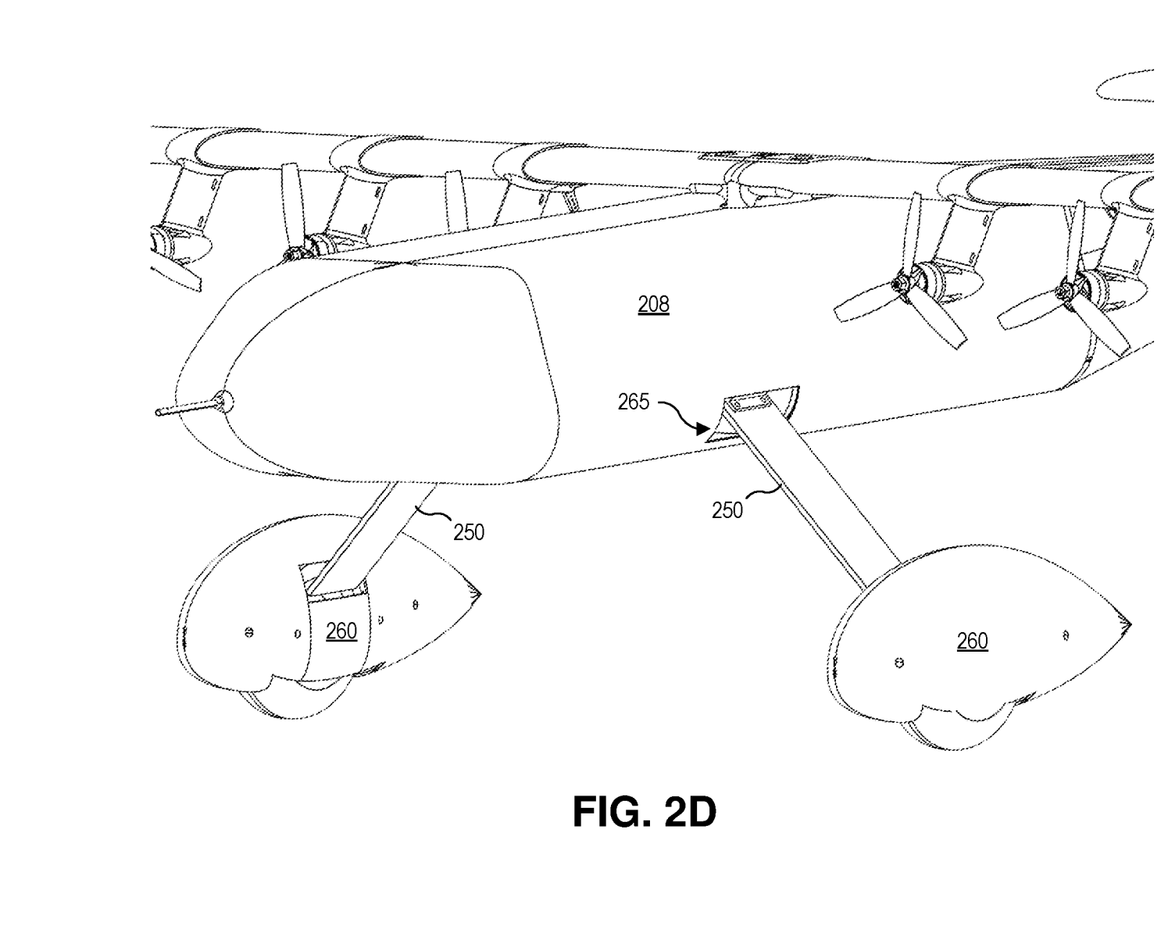
FIG. 2D is a closeup perspective view illustration of the STOL UAV depicting how the suspension assembly of the landing gear is entirely housed within a fairing cross-section of the fuselage, in accordance with an embodiment of the disclosure.

FIGS. 2A-D illustrate a UAV 200 with distributed propulsion units and blown control surfaces to provide STOL characteristics, in accordance with an embodiment of the disclosure. UAV 200 is one possible implementation of UAVs 105. FIG. 2A is a perspective view illustration of UAV 200, FIG. 2B is a side view illustration, FIG. 2C is a front view illustration, and FIG. 2D is a closeup perspective view illustration of the same. The illustrated embodiment of UAV 200 includes a fuselage 205, a pair of fixed wings 210, a tail assembly 215, a landing gear assembly 220, distributed propulsion units 225 and 230, and on-board circuitry 235. The illustrated embodiment of fuselage 205 includes a structural frame (or airframe) formed from a central structural member 206, bulkhead ribs 207, and a fuselage skin (or fairing) 208 (only the nose cone portion is illustrated in FIG. 2A). The illustrated embodiment of fixed wings 210 have an aerodynamic shape to provide lift along with control surfaces such as ailerons and flaps. The illustrated embodiment of tail assembly 215 includes horizontal stabilizers having elevators and a vertical stabilizer having a rudder. The illustrated embodiment of on-board circuitry 235 includes a controller 237, a battery unit 239, sensors 241, and communication circuitry 243.

UAV 200 is a STOL aircraft adapted for package delivery missions. UAV 200 has a fixed wing targeting a larger payload capacity and extended range over a VTOL UAV of similar size and weight. Distributed propulsion units 225 are mounted to fixed wings 210 with their propeller blades positioned fore of the leading edge of fixed wings 210 to provide a blown surface for augmented lift at low airspeeds. Similarly, distributed propulsion units 230 are mounted to tail assembly 215 inline with their corresponding stabilizers to provide a blown surface having increased control authority at low airspeeds. The blown lift and control surfaces aid the STOL characteristics of UAV 200. In turn, as discussed in further detail below, landing gear assembly 220 provides a robust undercarriage capable of sustaining and controlling the higher impact and rebound forces associated with the steep approach angles of a STOL aircraft.

In the illustrated embodiment, the airframe of UAV 200 includes central structural member 206 extending along a fore-to-aft longitudinal axis of UAV 200. Bulkhead ribs 207 are mounted to and encircle central structural member 206 at a plurality of different locations along the fore-to-aft longitudinal axis. Bulkhead ribs 207 may define a number of different internal compartments. For example, in one embodiment, a fore compartment houses battery 239 while the mid and aft compartments house a payload bay for carrying and a deploying package. Other electronics including controller 237, sensors 241, and communication circuitry 243 may be housed throughout one or more of these compartments. Of course, one or more of these components may span multiple compartments and be disposed in other locations. The internal components are protected by fairing 208, which wraps around bulkhead ribs 207. Central structural member 206 is the primary structural member of the aircraft, to which the other primary components mount. In the illustrated embodiment, tail assembly 215 mounts to an aft portion of central structural member 206 while fixed wings 210 and landing gear assembly 220 mount to a mid-section of central structural member 206. Central structural member 206 may be implemented as a tube or rod fabricated from a variety of rigid, lightweight materials such as aluminum, carbon fiber composite, or otherwise.

The illustrated embodiment of landing gear assembly 220 includes leg members 250, suspension assemblies 255, a shock tower (not fully illustrated in FIGS. 2A-D), and ground gear 260. The landing gear assembly 220 is mounted to the airframe via the shock tower, which itself links to proximal ends of leg members 250 and upper ends of suspension assemblies 255.

Leg members 250 extend out from opposing sides of the fuselage 205 through openings 265 and connect to ground gear 260. Leg members 250 are flexible members that are pivotally mounted to the shock tower. Leg members 250 contribute their own spring constants to suspension assemblies 255 thereby contributing to the overall multistage stage suspension of landing gear assembly 220. Leg members 250 physically offset ground gear 260 from fuselage 205, providing adequate clearance for suspension travel and avoiding bottoming out of the underbelly of fuselage 205 during initial impact. Leg members 250 are streamlined, presenting a narrow profile to the direction of airflow for reduced drag.

Suspension assemblies 255 connect between an upper end mount of the shock tower and leg members 250 providing spring resistance and shock dampening to the overall landing gear assembly 220. In the illustrated embodiment, suspension assemblies 255 are housed within fuselage 205 such that their springs are shielded within the fairing cross-section of fuselage skin 208 even when the suspension is fully extended during flight, thereby reducing drag from landing gear assembly 220. Referring to the embodiment illustrated in FIG. 2D, only leg members 250 and ground gear 260 are presented to the ambient airflow outside fuselage 205 during flight.

In the illustrated embodiment, ground gear 260 is illustrated as running gear with wheels and low-drag wheel pants. Running gear is suitable for STOL aircraft intended for ground landings on a smooth surface (e.g., tarmac runway). However, other types of ground gear may be mounted to the distal ends of leg members 250 including skids, pontoons, pads, telescoping feet, etc. While landing gear assembly 220 is particularly well suited for STOL UAVs, it should be appreciated that embodiments of landing gear assembly 220 are also applicable to other types of UAVs including VTOL UAVs, conventional UAVs, float plane UAVs, etc.

Figure 3:
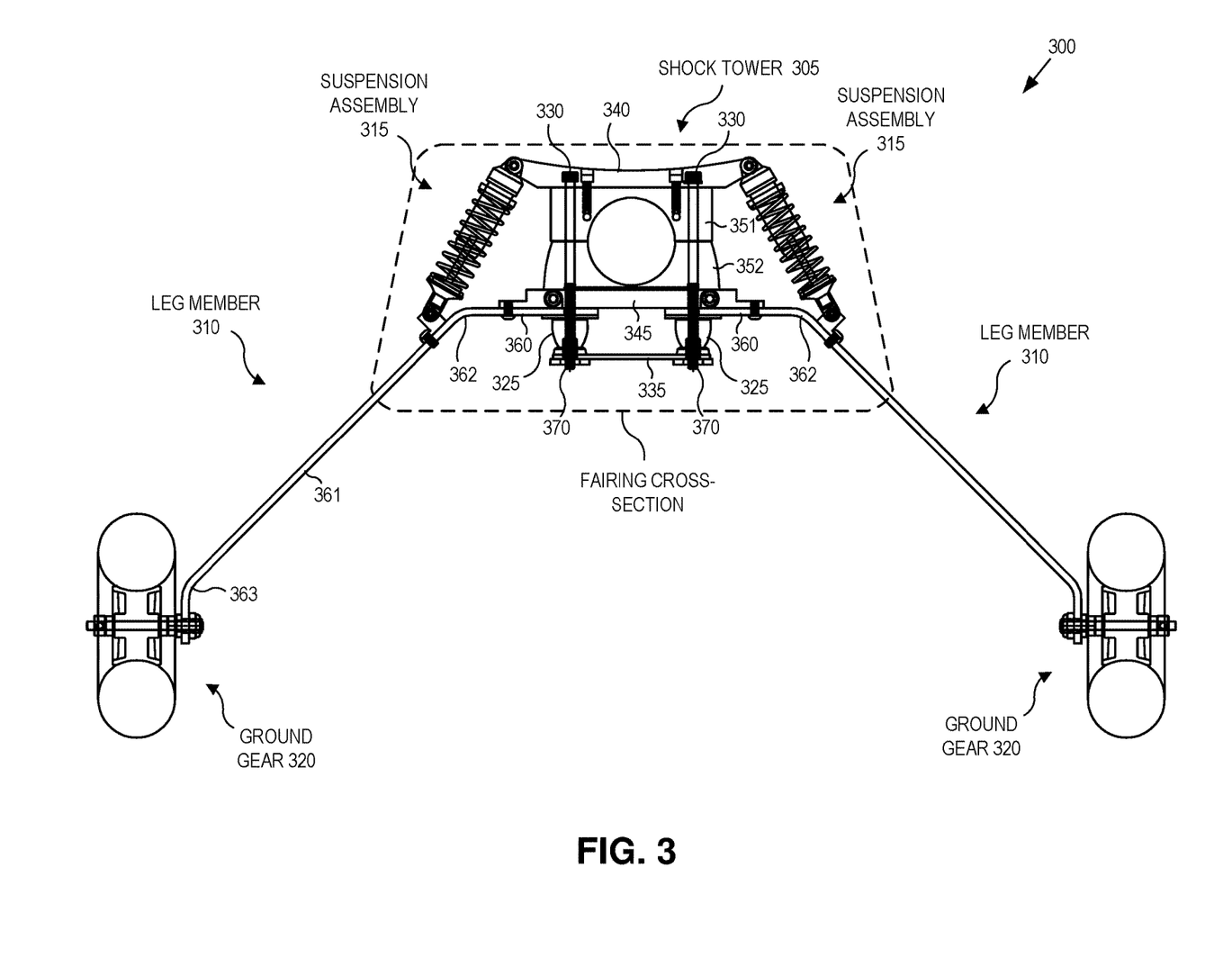
FIG. 3 is a cross-sectional illustration of a landing gear assembly well-suited for use in STOL UAVs, in accordance with an embodiment of the disclosure.
Figure 4A:
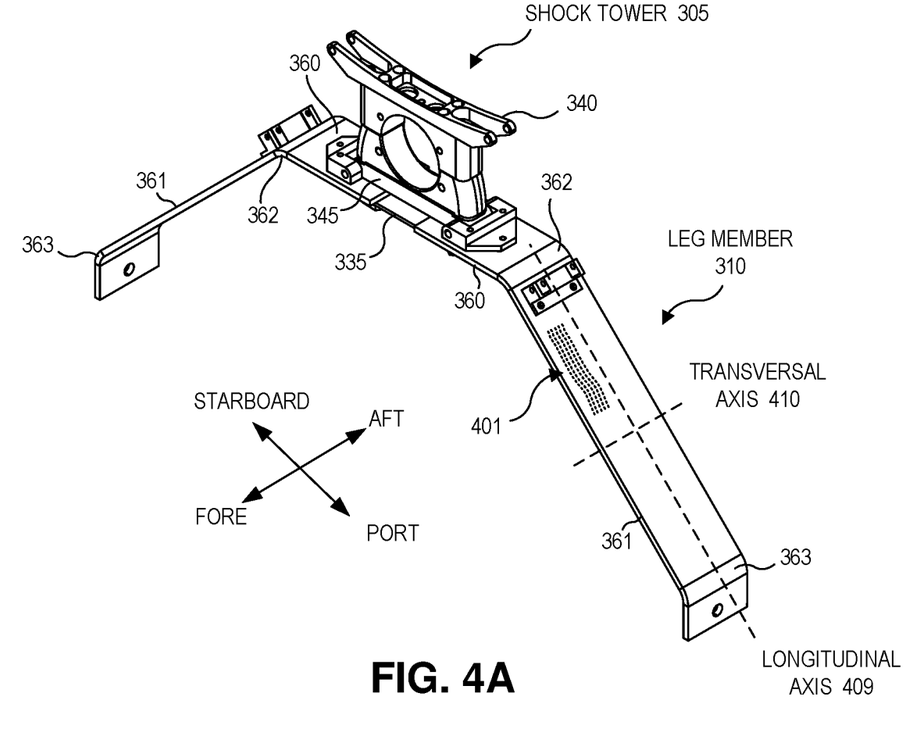
FIG. 4A is a perspective view illustration of the shock tower and leg members of the landing gear assembly, in accordance with an embodiment of the disclosure.
Figure 4B:
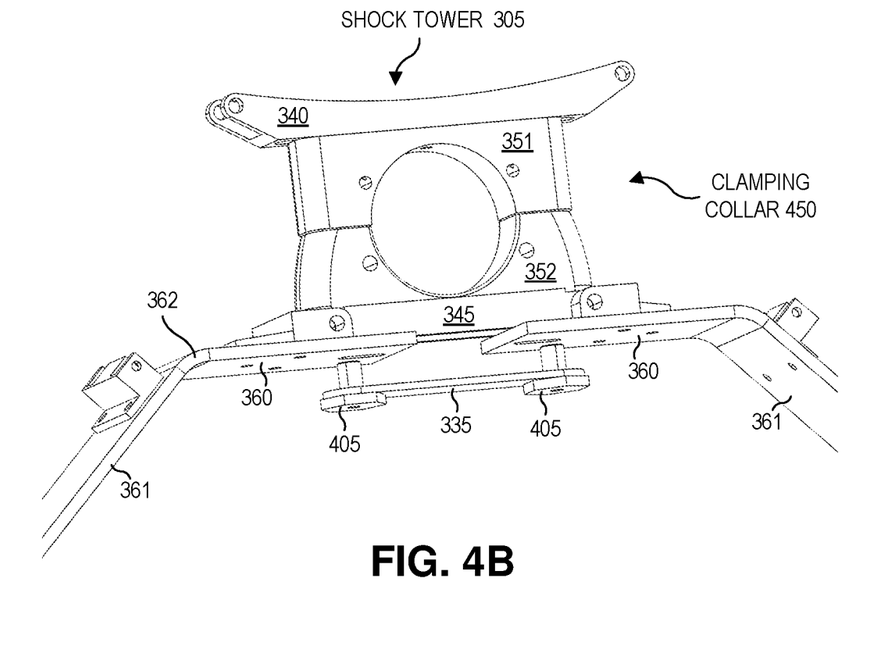
FIG. 4B is a perspective view illustration of a crosstie member and preload nuts of the landing gear assembly, in accordance with an embodiment of the disclosure.
Figure 4C:
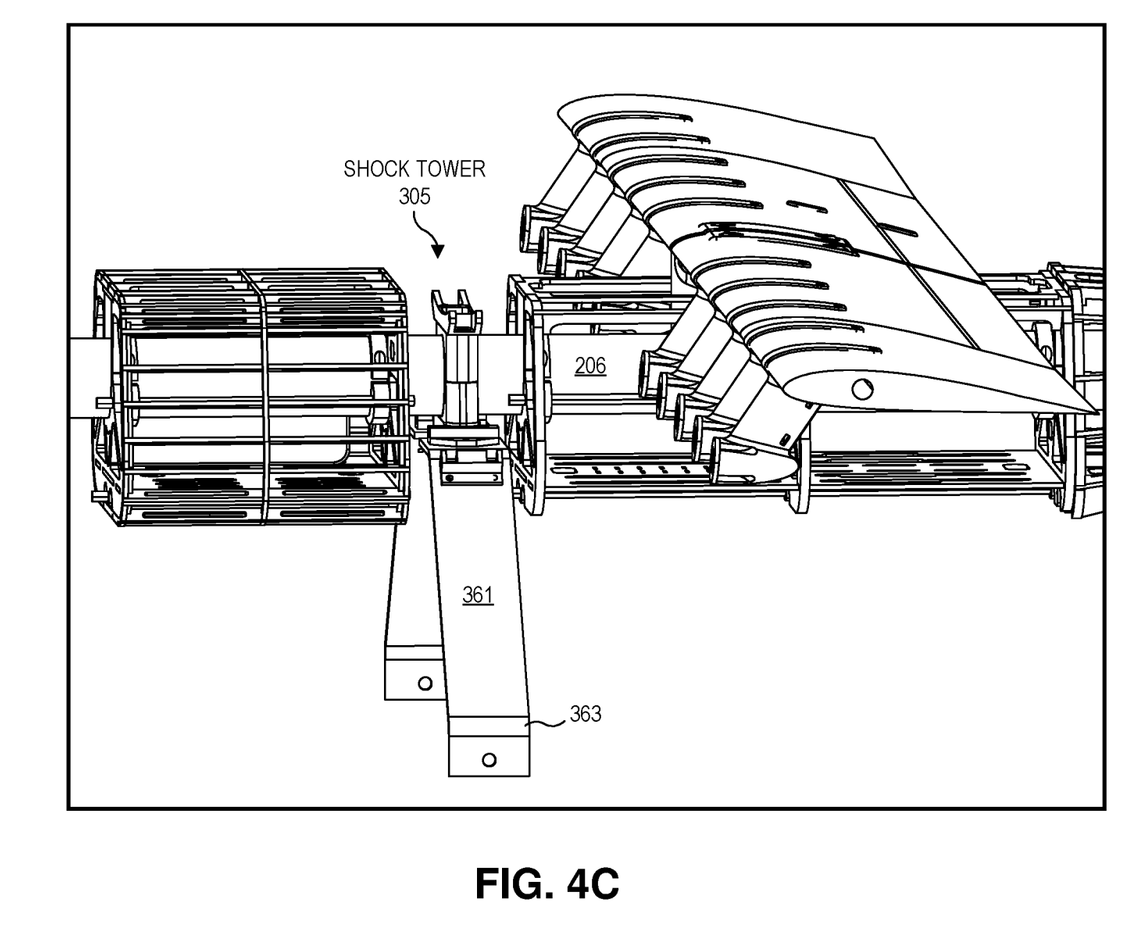
FIG. 4C is a closeup illustrating how the shock tower includes a clamping collar adapted to clamp around a central structural member of the fuselage frame, in accordance with an embodiment of the disclosure.

FIG. 3 is a cross-section illustration of a landing gear assembly 300, in accordance with an embodiment of the disclosure. Landing gear assembly 300 is one possible implementation of landing gear assembly 220 illustrated in FIGS. 2A-D. FIGS. 4A-C are closeup illustrations of different aspects of landing gear assembly 300. The illustrated embodiment of landing gear assembly 300 includes a shock tower 305, a pair of leg members 310, suspension assemblies 315, ground gear 320, preload bumpers 325, thru-bolts 330, and a crosstie member 335. The illustrated embodiment of shock tower 305 includes an upper end mount 340, a lower end mount 345, and a clamping collar 450 formed by upper and lower collars 351 and 352 (see FIG. 4B). The illustrated embodiment of each leg member 310 includes an upper leg section 360, a lower leg section 361, a fixed knee bend 362, and a fixed ankle bend 363 (see FIG. 4A). The illustrated embodiment of suspension assemblies 315 each includes a pair of coilover struts having a spring over dampener configuration. Landing gear assembly 300 further includes other notable fasteners including preload nuts 405 (see FIG. 4B) and set screws 370 (see FIG. 4A), as well as other fasteners as illustrated.

As illustrated in FIG. 3, leg members 310 each include a fixed knee bend 362 disposed between upper leg section 360 and lower leg section 361. Suspension assemblies 315 extend between lower leg sections 361 and upper end mount 340. The suspension assemblies 315 are pivotally mounted to both upper leg section 361 and upper end mount 340 to allow pivot motion during suspension travel. Ground gear 320 is mounted to a distal end of lower leg section 361 where fixed ankle bend 363 is disposed for mounting to an axle hub of ground gear 320 (e.g., running gear wheel). Referring to FIG. 4A, leg members 310 are flattened members having a narrow edge surface facing fore and aft for reduced drag and a wide side surface facing port and starboard.

Leg members 310 may be fabricated of a variety of materials, such as various metal alloys (e.g., aluminum 6061-T6), composite materials (e.g., carbon fiber), or otherwise. In one embodiment, leg members 310 are fabricated of a material having a grain structure 401 oriented to be stiffer along a longitudinal axis 409 than a transversal axis 410. In the illustrated embodiment, this stiffer orientation aligns grain structure 401 to be parallel with longitudinal axis 409. In the examples of aluminum alloy, grain structure 401 is selected by the direction the metal alloy is rolled during manufacture while grain structure 401 of carbon fiber composite is associated with the carbon fibers embedded within the surrounding resin of the composite material. Appropriate selection of grain direction can increase strength and the spring constant associated with leg members 310 for a given size, weight, and mechanical cross-section of these members.

Shock tower 305 serves multiple purposes. First, shock tower 305 provides mounting points for both suspension assemblies 315 and upper leg sections 360. Second, shock tower 305 secures landing gear assembly 300 into UAV 200 and transfers impact load forces to the structural frame of UAV 200. Shock tower 305 accomplishes these purposes with few components having relative low mass. In the illustrated embodiment, shock tower 305 includes clamping collar 450 for securing directly onto central structural member 206 of the fuselage frame (see FIG. 4C). This mechanical clamp is facilitated with thru-bolts 330 that extend through upper and lower end mounts 340, 345 and clamping collar 450. Thru-bolts 330 are mechanical fasteners that provide a mechanical clamping force via upper and lower collars 351 and 352 to the frame of UAV 200. In the illustrated embodiment, thru-bolts 330 thread into preload nuts 405 (see FIG. 4B) and not only apply clamping force to clamping collar 450, but also extend through, secure, and compress preload bumpers 325.

Figure 5:
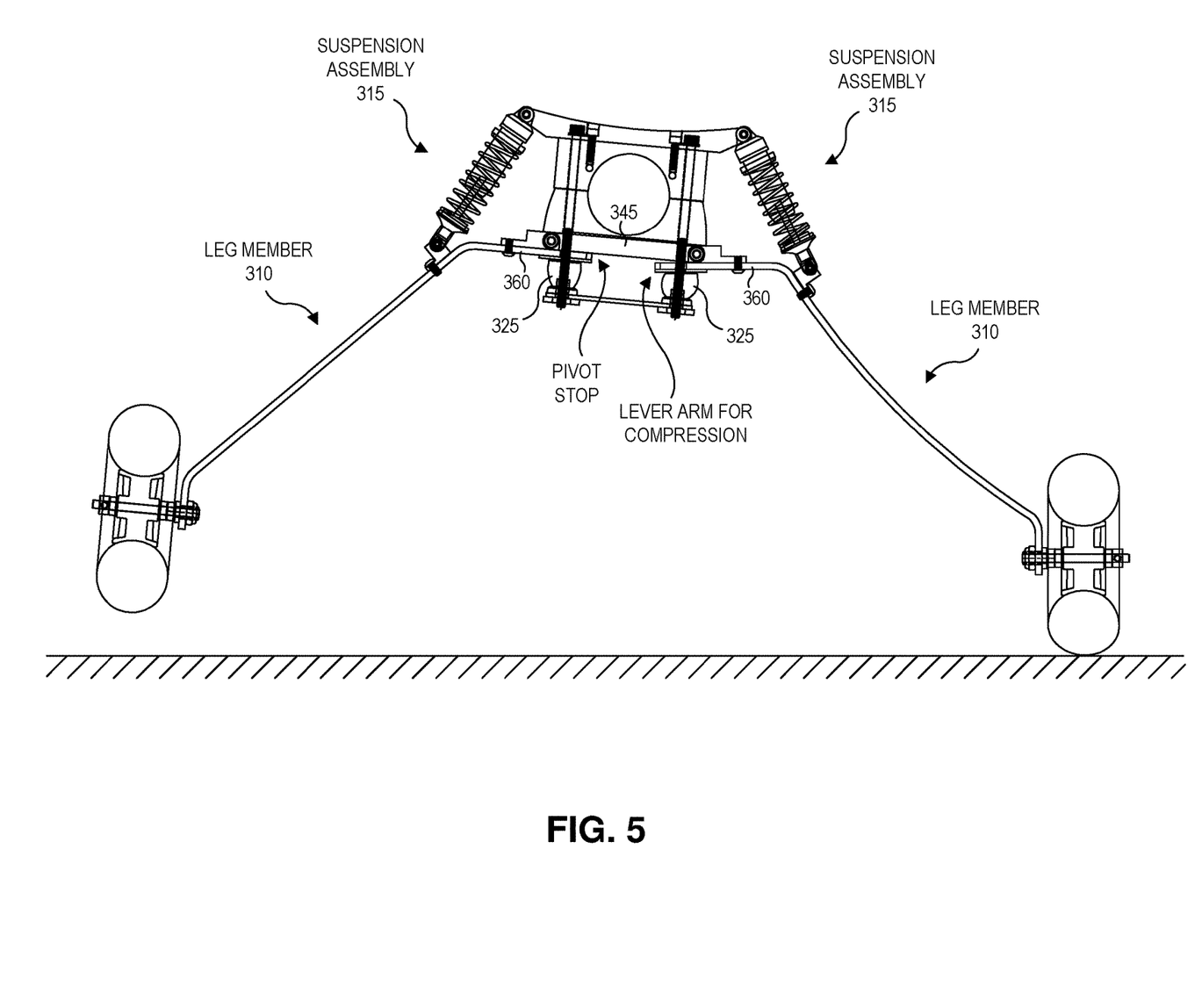
FIG. 5 is a cross-sectional view of the landing gear assembly illustrating interaction between the multiple spring constants providing a multistage damped response, in accordance with an embodiment of the disclosure.

Preload bumpers 325, similar to the coil springs of the suspension assemblies 315, add a preload tension to the landing gear. Preload bumpers 325 are compressed against the undersides of upper leg sections 360 by turning preload nuts 405, in turn pressing upper leg sections 360 against lower end mount 345. The pivot connections between leg members 310 and lower end mount 345 establish lever arms with upper leg sections 360, which further compress preload bumpers 325 when suspension assemblies 315 are compressed. FIG. 5 illustrates how upper leg section 360 of right-side leg member 310 operates as a lever arm compressing the right preload bumper 325 when the right-side suspension assembly is compressed. Correspondingly, FIG. 5 also illustrates how upper leg section 360 operates as a pivot stop pressing against the underside of lower end mount 345 and limiting the full extension of the left-side suspension assembly 315 when the left-side ground gear 320 is not engaged. Preload bumpers 325 may be fabricated of a variety of compressible materials, such as rubber or other elastic materials.

As mentioned above, shock tower 305 connects running gear assembly 300 to the airframe. In the illustrated embodiment, thru-bolts 330 extend through upper end mount 340, clamping collar 450, and lower end mount 345, and extend into preload bumpers 325. The preload nuts 405 extend up through crosstie member 335 and thread into corresponding thru-bolts 330. As such, preload nuts 405 not only apply the preload compression to preload bumpers 325, but also apply the clamping force for securing clamping collar 450 around central structural member 206 of the airframe. Using crosstie member 335 to support the distal ends of thru-bolts 330 enables the use of smaller diameter bolts, thereby reducing weight, while maintaining the necessary structural rigidity of landing gear assembly 300. The preload tension and clamping force applied by preload nuts 405 may be locked in place with set screws 370 (see FIG. 3) threaded into backsides of preload nuts 405 and jammed against the distal ends of thru-bolts 330.

The illustrated embodiment of suspension assemblies 315 includes a pair of springs and dampers on each of the starboard and port sides of fuselage 205 per leg member 310. Of course, a single spring and damper configuration may be implemented per side. The illustrated springs and dampers have a coilover mono-shock strut configuration using coil springs disposed over a liquid filled damper piston (e.g., dashpot). However, the coilover configuration represents just one possible implementation, which may be varied in several respects. For example, the coilovers may be replaced with linear spring-loaded guides, the coil spring may be separated from the damper (e.g., non-coilover configuration), liquid dampers may be replaced with other forms of dampers, etc.

Leg members 310, preload bumpers 325, and the coil springs of suspension assemblies 315 collectively provide a multistage suspension. Each of these components contributes a spring constant to the overall suspension response. In one embodiment, preload bumpers 325 provide the stiffest spring constant and immediate shock relief to the airframe and landing gear at the initial moment of impact. The springs of suspension assemblies 315, fluid in the dampers, and the flexibility of leg members 310 provide suspension travel and absorb the impact energy while the dampers of suspension assemblies 315 control the rebound rate and dissipate the impact energy in a controlled manner. The dampers resist motion of the springs (e.g., via viscous friction), absorbing kinetic energy, ensuring that the oscillation of the landing gear decay at a desired rate.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A landing gear assembly for an unmanned aerial vehicle (UAV), the landing assembly comprising:
    a shock tower adapted to mount to a frame of a fuselage of the UAV, the shock tower including upper and lower end mounts;
    a pair of leg members adapted to extend out from opposing sides of the lower end mount, wherein each of the leg members is flexible and includes an upper leg section pivotally mounted to the lower end mount and a lower leg section adapted to connect to a ground gear;
    suspension assemblies each mounted to and extending between the upper end mount and a corresponding one of the leg members, each of the suspension assemblies including a damper and a spring; and
    preload bumpers each compressed against the upper leg section of a corresponding one of the leg members to press the upper leg section against the lower end mount, wherein the shock tower includes a clamping collar adapted to clamp around a central structural member of the frame, and wherein thru-bolts extend through the upper and lower end mounts, through the clamping collar, and into the preload bumpers.

2. The landing gear assembly of claim 1, wherein the leg members each further comprise a fixed knee bend between the upper and lower leg sections and each of the suspension assemblies is pivotally mounted to the lower leg section below the fixed knee bend of the corresponding one of the leg members.

3. The landing gear assembly of claim 2, wherein the ground gear comprises a running gear wheel and wherein the leg members each further comprise a fixed ankle bend disposed at a distal end of the lower leg section for mounting to an axle hub of the running gear wheel.

4. The landing gear assembly of claim 1, wherein the leg members each have a narrow edge surface facing fore or aft and a wide side surface facing port or starboard, and wherein the leg members are fabricated of a material having a grain structure oriented to be stiffer along a longitudinal axis of each of the leg members running from the upper leg section to the lower leg section than along a transversal axis running fore-to-aft.

5. The landing gear assembly of claim 4, wherein the leg members comprise an aluminum alloy or a carbon fiber composite with the grain structure running parallel to the longitudinal axis.

6. The landing gear assembly of claim 1, wherein the upper leg section operates as a pivot stop that presses against the lower end mount to limit a full extension of the spring and further compresses a corresponding one of the preload bumpers when the spring is compressed.

7. The landing gear assembly of claim 1, wherein proximal ends of the preload bumpers compress against the lower end mount, the landing gear assembly further comprising:
    a crosstie member rigidly cross-connecting distal ends, opposite the proximal ends, of the preload bumpers.

8. The landing gear assembly of claim 1, further comprising:
    preload nuts that thread onto the thru-bolts to adjustably compress the preload bumpers; and
    set screws adapted to thread into the preload nuts and jam against ends of the thru-bolts to lock the preload nuts.

9. The landing gear assembly of claim 1, wherein the suspension assemblies comprise a pair of coilover struts disposed on either side of the shock tower.

10. An unmanned aerial vehicle (UAV), comprising:
    a fuselage including a frame; and
    a landing gear assembly connected to the fuselage and adapted to absorb an impact shock when the UAV lands, the landing gear assembly including:
        a shock tower mounted to the frame, the shock tower including upper and lower end mounts;
        a pair of leg members extending out from opposing sides of the fuselage, wherein each of the leg members is flexible and includes an upper leg section pivotally mounted to the lower end mount and a lower leg section connected to a ground gear;
        suspension assemblies mounted to and extending between the upper end mount and a corresponding one of the leg members, each of the suspension assemblies including a damper and a spring; and
        preload bumpers each compressed against the upper leg section of a corresponding one of the leg members to press the upper leg section against the lower end mount,
        wherein thru-bolts extend through the upper and lower end mounts of the shock tower and extend through the preload bumpers,
        wherein the upper end mount of the shock tower and the spring of each of the suspension assemblies are disposed within a fairing cross-section of the fuselage while the leg members pass through openings in the fuselage.

11. The UAV of claim 10, wherein the suspension assemblies are mounted such that the spring remains entirely within the fairing cross-section of the fuselage when the suspension assemblies are fully extended during flight of the UAV.

12. The UAV of claim 10, wherein the frame includes a central structural member extending fore-to-aft within the fuselage, wherein the shock tower includes a clamping collar adapted to clamp around the central structural member.

13. The UAV of claim 10, wherein the upper leg section operates as a pivot stop that presses against the lower end mount to limit a full extension of the spring and further compresses a corresponding one of the preload bumpers when the spring is compressed.

14. The UAV of claim 10, wherein proximal ends of the preload bumpers compress against the lower end mount, the landing gear assembly further comprising:
    a crosstie member rigidly cross-connecting distal ends, opposite the proximal ends, of the preload bumpers.

15. The UAV of claim 10, wherein the landing gear assembly further comprises:
    preload nuts that thread onto the thru-bolts to adjustably compress the preload bumpers; and
    set screws adapted to thread into the preload nuts and jam against ends of the thru-bolts to lock the preload nuts.

16. The UAV of claim 15, wherein the shock tower further comprises:
    a clamping collar disposed between the upper and lower end mounts, the clamping collar adapted to clamp onto the frame of the fuselage,
    wherein the thru-bolts extend through the clamping collar.

* * * * *